United States Patent
Phillips et al.

(10) Patent No.: US 9,605,730 B2
(45) Date of Patent: Mar. 28, 2017

(54) ADJUSTABLE ELEVATOR BELT SPLICE

(71) Applicant: Maxi-Lift, Inc., Addison, TX (US)

(72) Inventors: Paul Daniel Phillips, Frisco, TX (US); Lars Mees Muller, Bleiswijk (NL); Willem Bertus van der Wouden, Nieuwerkerk aan den IJssel (NL)

(73) Assignee: Maxi-Lift, Inc., Addison, TX (US)

( * ) Notice: Subject to any disclaimer, the term of this patent is extended or adjusted under 35 U.S.C. 154(b) by 46 days.

(21) Appl. No.: 14/176,739

(22) Filed: Feb. 10, 2014

(65) Prior Publication Data

US 2015/0226286 A1    Aug. 13, 2015

(51) Int. Cl.
   *F16G 3/06*    (2006.01)

(52) U.S. Cl.
   CPC ........... *F16G 3/06* (2013.01); *Y10T 24/16* (2015.01); *Y10T 24/166* (2015.01); *Y10T 24/1664* (2015.01)

(58) Field of Classification Search
   CPC .......... F16G 3/06; Y10T 24/166; Y10T 24/16; Y10T 24/1664
   USPC .............................. 24/31 R, 37, 38
   See application file for complete search history.

(56) References Cited

U.S. PATENT DOCUMENTS

| | | | |
|---|---|---|---|
| 1,052,936 A * | 2/1913 | Mathews | F16G 3/06 24/31 F |
| 1,643,037 A | 9/1927 | Vollrath | |
| 1,686,300 A | 10/1928 | Vollrath | |
| 1,803,354 A | 5/1931 | Purple | |
| 1,878,003 A * | 9/1932 | Smith | F16G 3/06 24/31 F |
| 2,514,715 A | 7/1950 | Milik | |

(Continued)

FOREIGN PATENT DOCUMENTS

| | | |
|---|---|---|
| CH | 88019 | 1/1921 |
| DE | 2231322 | 1/1974 |

(Continued)

OTHER PUBLICATIONS

Maxi-Lift Inc., Elevator Buckets & Accessories Catalog, Jul. 2013, p. 18.
Extended European Search Report and European Search Opinion dated Jul. 29, 2015, for European Application No. 15154390.7 (8 pages).

(Continued)

*Primary Examiner* — Robert J Sandy
*Assistant Examiner* — Louis Mercado
(74) *Attorney, Agent, or Firm* — Gardere Wynne Sewell LLP

(57) ABSTRACT

A device for splicing two belt ends together, the device having a first outer clamping plate, a second outer clamping plate, and a central plate disposed between the first and second outer clamping plates. Each of the first and second outer clamping plates includes inwardly facing surfaces oriented toward the central plate. Gripping surfaces of the devices are improved. A first gripping region is disposed on the inwardly facing surfaces of the first and second outer clamping plates, the first gripping region having a plurality of rows of teeth. A second gripping region is disposed on the inwardly facing surfaces of the first and second outer clamping plates and includes spaced apart elongated recesses positioned parallel to a long axis of the first and second outer clamping plates. A wedge member, to accommodate different sized and shaped belts, is removably coupled to an end of the central plate.

21 Claims, 3 Drawing Sheets

(56) References Cited

U.S. PATENT DOCUMENTS

| | | | |
|---|---|---|---|
| 4,027,939 A | * | 6/1977 | White .................. H01R 4/5091 24/136 B |
| 4,056,867 A | | 11/1977 | Wert et al. |
| D261,750 S | | 11/1981 | Miller |
| 4,489,827 A | | 12/1984 | Anderson |
| 4,540,389 A | | 9/1985 | Ramsey |
| 4,734,959 A | | 4/1988 | Jaubert |
| 4,757,576 A | | 7/1988 | Jaubert |
| D299,077 S | | 12/1988 | Abbestam et al. |
| D301,179 S | | 5/1989 | Miller |
| 5,114,001 A | | 5/1992 | Anderson |
| 7,707,693 B2 | | 5/2010 | Schaefer |
| D701,015 S | | 3/2014 | Specht |
| D724,289 S | * | 3/2015 | Phillips ........................... D34/29 |
| 2008/0200295 A1 | * | 8/2008 | Schaefer .................. F16G 3/06 474/255 |

FOREIGN PATENT DOCUMENTS

| | | |
|---|---|---|
| DE | 8420953 | 10/1984 |
| EP | 2910814 | 8/2015 |

OTHER PUBLICATIONS

Machine translation of CH 88019 published Jan. 17, 1921, available from epo.org (2 pages).
Machine translation of DE 2231322 published Jan. 10, 1974, available from epo.org (5 pages).
Machine translation of DE 8420953 published Oct. 11, 1984, available from epo.org (3 pages).
Communication pursuant to Article 94(3) EPC dated Apr. 7, 2016 in corresponding European Patent Application No. 15154390.7, 4 pages.

* cited by examiner

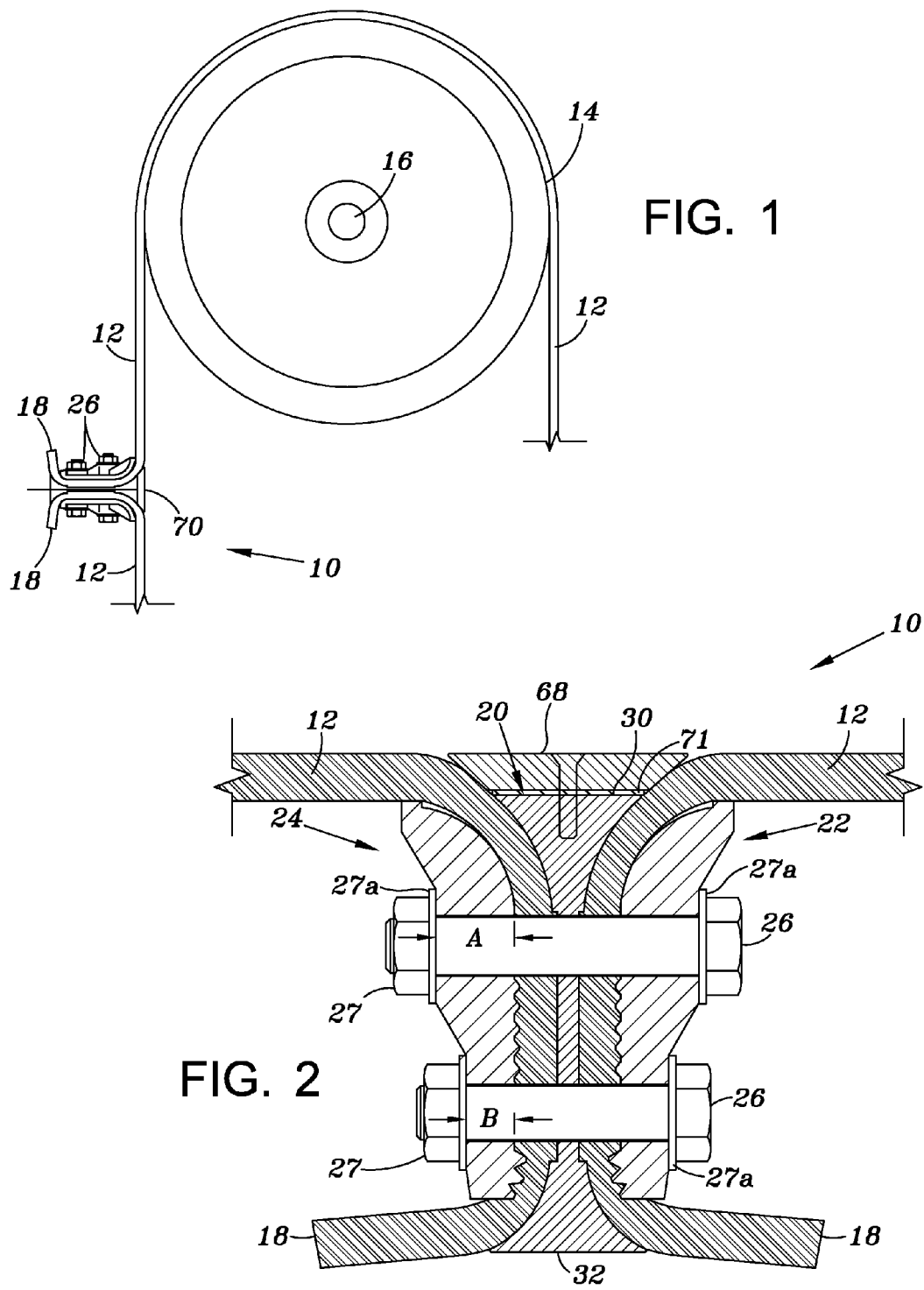

ADJUSTABLE ELEVATOR BELT SPLICE

TECHNICAL FIELD

The disclosure relates generally to a clamping device, and more particularly, to an elevator belt splice, the belt splice being adjustable to accommodate different sized belts, having improved surfaces that relieve strain, increased strength and improved gripping forces.

BACKGROUND

In the art of elevator-type material conveyor systems, containers or so-called "buckets" are supported spaced-apart on an endless belt for moving particular material substantially vertically. The ends of such elevator belts and/or the ends of two adjacently positioned elevator belts are typically secured together by belt splices, stapling or some other attaching method. However, many current methods of attachment and designs are susceptible to premature failure. For example, many elevator belt splices are unable to withstand the high tension forces acting on elevator belts during operation. Furthermore, many existing splice designs are unable to effectively support the curvature of the portion of the belt between the tension plane and the actual clamping surface of the belt. In addition, the manufacture of many current elevator belt designs results in devices that bulky and expensive to manufacture. More importantly, such designs are unable to accommodate differing sized belts (i.e., belts having different thicknesses). There remains a need for belt clamping or splice devices that overcome the problems mentioned.

SUMMARY

Described herein is a device for connecting and otherwise splicing two belt ends and/or two belts together. The belt splice device includes a first outer clamping plate, a second outer clamping plate and a central plate disposed between the first and second clamping plates. Each of the first and second clamping plates includes inwardly facing surfaces oriented toward the central plate. The device further includes a first gripping region disposed on the inwardly facing surfaces of the first and second clamping plates, the first gripping region having a plurality of rows of slotted teeth. A second gripping region is disposed on the inwardly facing surfaces of the first and second clamping plates and has a plurality of spaced apart elongated recesses positioned parallel to a long axis of the first and second clamping plates. A wedge member is removably coupled to an end of the central plate. At least one spacer member is optionally sandwiched between the wedge member and the central plate so that the belt splice can accommodate different thicknesses of belts. The wedge and one or more spacers are secured to the end of the central plate by at least one locking mechanism extending through the wedge member, the spacer, and into the end of the central plate.

Those skilled in the art will further appreciate the advantages and superior features described upon reading the description which follows in conjunction with the drawings.

BRIEF DESCRIPTION OF THE DRAWINGS

Additional features, as well as more details thereof, and the overall systems and devices described herein, will become readily apparent from a review of the following detailed description, taken in connection with the accompanying drawings, in which:

FIG. 1 is a schematic view of the elevator belt splice connecting the ends of an elevator belt, the belt trained around a pulley;

FIG. 2 is an enlarged sectional view of the elevator belt splice device illustrated in FIG. 1;

DETAILED DESCRIPTION

Figure 3:
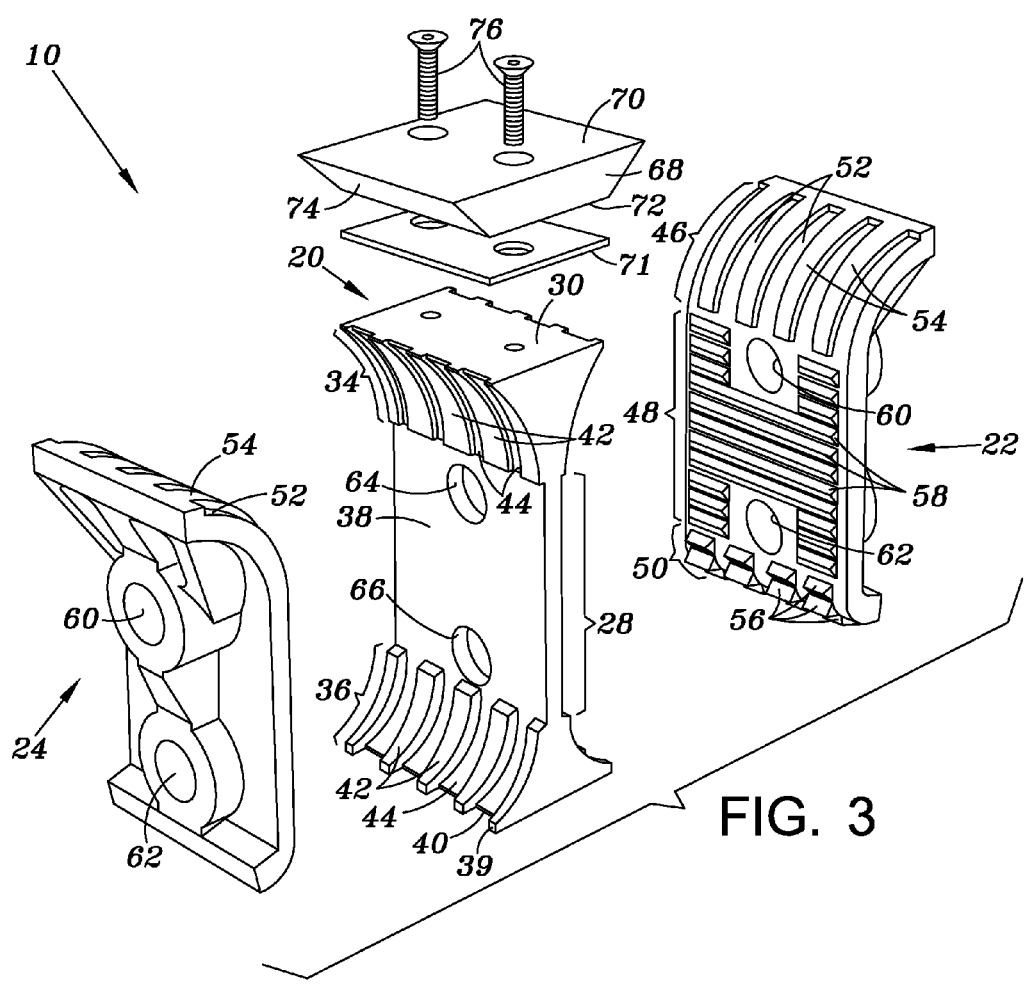
FIG. 3 is an exploded perspective view of the elevator belt splice of FIGS. 1.

In the detailed description, like elements are marked throughout the specification and drawings with the same reference numerals, respectively. The drawing figures are not necessarily to scale and certain elements are shown in generalized or schematic form in the interest of clarity and conciseness. It should be understood that the embodiments of the disclosure herein described are merely illustrative of the principles of the invention.

Generally, described herein is an elevator belt splice device for splicing the ends of a belt together in juxtaposed relation. The belt splice device includes a central plate and two outer clamping plates. The belt is disposed between the central plate and respective outer clamping plates so that the clamping plates are drawn together upon the central plate by a clamping means, such as a pair of bolts, to minimize stress concentrations and more evenly distribute the pressure forces across the belt splice. The outwardly facing sides of the central plate have outwardly curving belt engaging surfaces. Opposing each outwardly facing side of the central plate is one of the outer clamping plates. Each outer clamping plate has an outwardly curving belt engaging surface that has at least a portion that complements the outwardly curving belt engaging surface of the central plate. The two outer plates and the central plate cooperate to pre-tension the belt as the clamping elements are tightened together.

Referring now specifically to FIGS. 1 and 2, the elevator belt splice 10 is depicted splicing together two ends 18 of a typical industrial belt 12. As shown schematically, the industrial belt 12 is positioned about a pulley 14, which rotates about a shaft 16 during operation. The elevator belt splice device 10 comprises a generally elongate central plate 20 and a pair of outer clamping plates 22, 24. When configured a belt 12, as depicted in FIG. 2, the outer clamping plates 22, 24 are in juxtaposed position about the central plate 20 and the belt 12. As shown, the elongate central plate 20, the belt 12 and the outer clamping plates 22, 24 are retained in functional position by two clamping means 26. The clamping means, as depicted in FIG. 2, include two threaded bolts, each of which include mating nuts 27 threadedly disposed at their ends and washers 27a when the threaded bolts are positioned through apertures on the central plate 20 and each of outer clamping plates 22 and 24, as discussed in further detail below. Alternative clamping means 26 may be used, in their customary manner, including locking nuts, locking fasteners, locking pins and the like, that secure the outer clamping plates 22 and 24 with the belt 12 in place as generally represented in FIG. 2.

Figure 4:
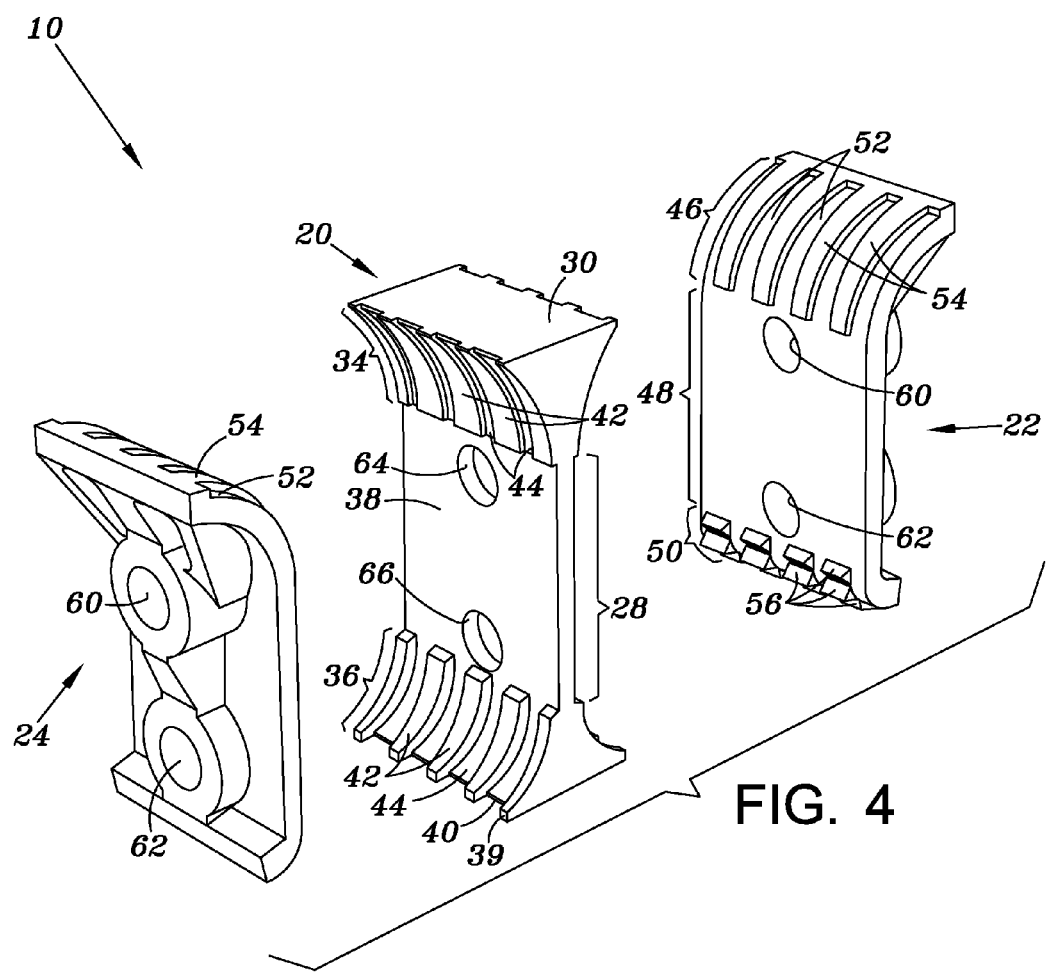
FIG. 4 is an exploded perspective view of an alternate embodiment of the elevator belt splice described herein.

Exploded views of the belt splice device 10 are shown in FIGS. 3 and 4, each illustrating the central plate 20 and outer clamping plates 22 and 24. The central plate 20 includes a generally planar mid-portion 28 and curvilinear sections 34 and 36 that terminate in first and second ends adjacent respective first and second edges 30 and 32. In the orientation shown, when both belt ends 18 are as illustrated in FIG. 2, section 34 having a first edge 30 is commonly referred to as the leading end of the belt splice device 10 and section 36 having a second edge 32 is referred to as the trailing end of the belt splice device 10. As shown, the central plate 20 with its planar mid portion 28 and divergent curvilinear sections 34 and 36 provides a configuration that is an "I" or somewhat bone-shaped in cross-section, as illustrated specifically in FIGS. 2 and 3. First and second edges 30 and 32 of central plate 20 have surfaces that are generally coplanar. Each of the planar mid portion 28, section 34 and section 36 further comprise belt engaging surfaces. According to some embodiments, the belt engaging surface 38 of the planar portion 28 is generally continuous with each of the belt engaging surfaces of sections 34 and 36.

In one or more embodiments, the belt engaging surfaces of sections 34 and 36 each include a series of generally uniformly spaced apart teeth 39 having rectangular or square-shaped cross-sectional areas between which are valleys or basins 40. The teeth 39 are continuous with raised regions forming "peaks" or ridges 42 that terminate at planar mid portion 28. Other configurations of teeth are also suitable. As will be explained in greater detail below, the divergently curving belt engaging surfaces of sections 34 and 36 cooperate with mating surfaces on the two outer belt clamping plates 22 and 24. The complementary configurations of the belt engaging surfaces of central plate 20 and outer clamping plates 22 and 24 are so designed to retain belts 12 in a juxtaposed functional relation more efficiently with improved gripping forces, better weight distribution, and decreased stress concentrations along the belt surfaces than alternative belt clamping devices known and used in the industry.

Still referring to FIGS. 3 and 4, each of the divergently curving belt engaging surfaces of sections 34 and 36 formed of the series of parallel and essentially linear ridges 42 provide an outwardly curving patterned surface for gripping onto the corresponding surface of belt 12. The radius of curvature of the ridges 42 is greater than curvatures found in alternative belt splice devices. And, in combination with the recessed and wider valleys 44 located between wider ridges 42 of the described belt splice device 10, the overall gripping surface of the described belt splice device is considered to offer better engaging surfaces in which to conform the surface of belt 12 to the device, without significantly deforming the regions of contact that may result in buckling of the belt 12 or other unwanted outcomes.

In the embodiment illustrated in FIGS. 3 and 4, the outer clamping plates 22 and 24 have a general shape that is complementary to and allow a generally mating relationship with the central plate 20. Thus, each of outer clamping plates 22 and 24 include a generally planar mid-section 48 and first and second curvilinear end regions 46 and 50. The generally planar mid-section 48 mates with the planar mid portion 28 of central plate 20. The curvilinear section 34 of central plate 20 is in a generally mating or complementary relationship with the outwardly curving first region 46. The curvilinear section 36 of central plate 20 is in a generally mating or complementary relationship with at least a portion of outwardly curving second region 50. As shown, first and second outwardly curving regions 46 and 50 are curved in a manner to complement the curvilinear shape of sections 34 and 36, respectively. However, while outwardly curving first region 46 is formed of valleys 52 and ridges 54 that complement ridges 42 and valleys 44, respectively, of central plate 20, the outwardly curving second region 50 includes a different configuration. Second curvilinear region 50 has a series of individualized teeth 56 positioned in rows so as to be disposed in valleys 44 of curvilinear section 36 of central plate 20.

In one or more embodiments, the length of the outwardly curving second region 50 is not the same as the length of the curvilinear region 36. Nonetheless, the combination of complementary ridges and valleys in outwardly curving first region 46 when mating with curvilinear section 34 as well as the individualized teeth 56 that are disposed within valleys 44 of curvilinear section 36 provide a unique gripping surface for better force and pressure distribution across belts 12 when the belts 12 are gripped by the belt splice device 10. In some embodiments, it may also be desired to include a series of transverse spaced apart ribs 58 in the planar mid-section 48, which is considered to provide even further gripping force when desired, as depicted in FIG. 3. The transverse ribs 58 further assist in inhibiting or otherwise reducing the tendency of the belt 12 to shift along the gripping surfaces in the direction of the tension force thereon. Those skilled in the art will appreciate that particular orientations or thicknesses of gripping surfaces shown in FIG. 3 may be modified, or in some embodiments, be in a differing orientation, such as in the mid portion 28 of central plate 20, the mid sections 48 of the outer clamping plates 22, 24, or the outwardly curving second regions 50 of the outer clamping plates 22, 24.

All of the above features described as well as the implementation of two apertures 60 and 62 on outer clamping plates 22 and 24 that mate with apertures 64 and 66, respectively, of central plate 20, have been found to be effective in providing an even better distribution of force and pressure on belts 12 as compared with alternative belt splice devices. The improved configurations shown in FIGS. 1-4, which include better gripping forces over the surface area of the belt 12, ensure that there is little belt movement in both an axial and transverse directions when the belt splice device 10 is in use. Thus, when outer clamping plates 22 and 24 mate with and are clamped together with central plate 20, the gripping force has an added effect of further reducing the linear deflection (stretching) and also improving the resistance to axial shear, and reducing belt delamination in the area of transition between the normal planes of axial tension as compared with alternative belt splice devices. Referring specifically to FIG. 2, the thickness of the outer clamping plates 22 and 24 at arrow A, which is greater than the thickness at arrow B, allows more torque force and clamping force. This is particularly useful when gripping unusual shaped belts. In some embodiments the width of the splice device 10 is greater than alternative devices used for similar purposes. For example, the width of the splice device 10 may be about three inches.

As is best shown in FIG. 2, when the central plate 20 and outer clamping plates 22 and 24 are juxtaposed in functional relation about the belts 12, and as a first means 26 for tightening is positioned through apertures 60 and 64 and a second means 26 for tightening is positioned through apertures 62 and 66, outer clamping plates 22 and 24 are drawn together to compress the belt 12 against the central plate 20. In so doing, the surfaces and some material of the belt 12 is gripped by the belt engaging surface of the respective valleys and ridges of first curvilinear section 34 and first outwardly curving region 46. Similarly, the surface of belt 12 is gripped by teeth 56 of outwardly curving second region 50, the teeth 56 disposed in the valleys of second curvilinear section 36. Teeth 56 are preferably shaped with non-piercing tips or ends, or ends that minimize puncturing of the outer surface of the belt 12. Those skilled in the art will appreciate that the gripping or flow of material along the belt engaging surfaces of plates 20, 22, and 24 effectively provides an increase in shear resistance and a higher grip strength upon the elevator belt 12 that is difficult to break.

As also depicted in FIGS. 2 and 3, a wedge member 68 is optionally included, the wedge 68 having a first surface 70 and a second surface 72 is configured to be disposed onto first edge 30 of the central plate 20. Thus, the second surface 72 is also coplanar with the surface of first edge 30. The wedge 68 is affixed to central plate 20 by a means for fastening, which as shown, may include threaded screws 76. The wedge 68 is typically designed to be removable and replaceable in response to general wear and also to accommodate differing thicknesses of belts 12. Accordingly, wedge 68 may be of a number of desired thicknesses and/or widths in order to best accommodate the shape and size of belt 12. In addition, the side edges 74 of wedge 68 may be more or less angled, depending on the shape and size of belt 12.

Referring specifically to FIG. 3, the elevator belt splice 10 optionally includes at least one plate or spacer member 71 sized to fit between the wedge 68 and the central plate 20 to accommodate belts having different thicknesses. For example, in the event the belt 12 has a larger thickness, a plate 71 may be mounted between the wedge 68 and the central plate 20, which positions the first surface 70 of the wedge to be flush or substantially flush with an inner surface of the belt 12 (i.e., the surface of the belt 12 that contacts the pulley 16), as best illustrated in FIG. 2. Accordingly, as the belt splice 10 and the belt 12 travel around the pulley 16, the first surface 70 contacts the pulley 16 and reduces the amount of stress acting directly on the belt 12 as it travels therearound, if, for example, the first surface 70 were recessed and/or otherwise below the outer surface of the belt. Similarly, with belts 12 having a lesser thickness, a smaller/thinner plate 71 may be used or, if necessary, removed altogether. According to some embodiments, the plate 71 is approximately 2 mm thick and is sized to substantially fill the space between the wedge 68 and the central plate 20; however, it should be understood that the thickness of the plate 71 may vary along with the overall size and shape (i.e., it may only fill a portion of the space between the wedge 68 and the central plate 20).

In operation, one or a number of the belt splice devices 10 are arranged to secure the belt ends 18 and/or two or more belts 10 together. With a plurality of belt splice devices 10, the devices 10 are generally in a side by side relation along the entire width of the belt 12 to be spliced. In some embodiments, one of the belt clamping elements may be used as a pattern to punch clearance holes in the belt 12. Through the punched hole the fastening means 26 is inserted through the holes in the belts 12 when assembling the belt splice 10 as shown in the figures.

When the belt splice device 10 is so disposed with belts 12, the wider surface area, improved gripping surface and increase radius of curvature at ends of the of the belt splice device 10 improve the distribution of shear forces acting upon the surface of the belt and along the entire belt engaging surfaces of the belt splice device. The wedge 68, along with the spacer 71, enables the belt splice 10 to accommodate belts 10 of different thicknesses. Those skilled in the art will appreciate that these improvements are accomplished without the use of small pins, cutting edges, etc., affixed to the belt, such as to restrain surfaces of belt splicing devices, as is often used, in which such pins and cutting edges tend to pierce the belt surface, and occasionally the cords of the belts, thereby tending to reduce the ultimate tensile strength of the belt.

In one or more embodiments, the belt splice device 10 is manufactured, molded or cast using a non-sparking material. One example is a special cast aluminum. In certain embodiments, wedge 68 is a rubberized or rubber type material, natural or synthetic.

From the foregoing it will be seen that this invention is one well adapted to retain all of the ends and objectives hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof; it is to be understood that all matter herein set forth or shown in the accompanying drawings is to be interpreted as illustrative and not in a limiting sense.

The foregoing description is of exemplary embodiments and methods for operation. What is described is not limited to the described examples or embodiments. Various alterations and modifications to the disclosed embodiments may be made without departing from the scope of the embodiments and appended claims.

What is claimed is:

1. A device for splicing two belts together, the device comprising:
   a first clamping plate, a second clamping plate, and a central plate disposed between the first and second clamping plates, each of the first and second clamping plates including inwardly facing surfaces oriented towards the central plate;
   a first gripping region disposed on the inwardly facing surfaces, the first gripping region having a plurality of teeth arranged in spaced apart columns, and aligned in a plurality of rows, the spaced apart columns positioned parallel to a long axis of the first and second clamping plates;
   a second gripping region disposed on the inwardly facing surfaces, the second gripping region having a plurality of spaced apart elongated recesses positioned perpendicular to the first gripping region; and
   a wedge member removably coupled to an end of the central plate, the wedge secured to the end of the central plate by at least one locking mechanism extending through the wedge member, and into the end of the central plate.

2. The device of claim 1, wherein the device further comprises bolts securing the first clamping plate, the second clamping plate, and the central plate in a fixed position.

3. The device of claim 1, wherein the first clamping plate, the second clamping plate, and the central plate each have belt engaging surfaces in a mid-portion that are generally coplanar to each other.

4. The device of claim 1, wherein the first clamping plate, the second clamping plate, and the central plate each have belt engaging surfaces at opposing ends that curve outwardly.

5. The device of claim 1, wherein a mid-portion of the inwardly facing surfaces of the first and second clamping plates comprises the second gripping region.

6. The device of claim 1, wherein a mid-portion of the inwardly facing surfaces of the first and second clamping plates comprises a third gripping region having transverse spaced apart ribs.

7. The device of claim 1, wherein the first gripping region is disposed near or about a first end, the first end being outwardly disposed from a planar mid-portion.

8. The device of claim 1, wherein the second gripping region is disposed near or about a second end, the second end being outwardly disposed from a planar mid-portion.

9. The device of claim 1, wherein the wedge member is replaceable with a separate wedge member having a same shape and size, or having a different shape and size.

10. The device of claim 1, wherein the locking mechanism is any of an adhesive, one or more fasteners, or various combinations thereof.

11. The device of claim 1, wherein the second gripping region is disposed near or about a planar mid-portion of the first and second clamping plates.

12. An elevator belt splice device comprising:
a first clamping plate, a second clamping plate, and a central plate disposed between the first and second clamping plates, each of the first and second clamping plates including inner facing surfaces oriented toward the central plate, the first and second clamping plates each including outwardly curved opposing ends;
a first gripping region on the inner facing surfaces of a first opposing end of each of the first and second clamping plates, the first gripping region comprising a plurality of teeth arranged in spaced apart columns and aligned in a plurality of rows, the spaced apart columns positioned parallel to a long axis of the first and second clamping plates;
a second gripping region on the inner facing surfaces of each of the first and second clamping plates, the second gripping region comprising a plurality of spaced apart ridges positioned generally transverse to the long axis of the first and second clamping plates;
a third gripping region on the inner facing surfaces of each of the first and second clamping plates, the third gripping region comprising a plurality of spaced apart elongated ribs positioned parallel to the long axis of the first and second clamping plates;
the central plate having opposing flanged ends; and
a wedge removably affixed to one of the opposing flanged ends of the central plate.

13. The elevator belt splice device of claim 12, wherein the elevator belt splice device further comprises bolts securing the first clamping plate, the second clamping plate, and the central plate in a fixed position.

14. The elevator belt splice device of claim 12, wherein the first clamping plate, the second clamping plate, and the central plate each have belt engaging surfaces in a mid-portion that are generally coplanar to each other.

15. The elevator belt splice device of claim 12, wherein the first gripping region is disposed on a curvilinear portion of the first opposing end of each of the first and second clamping plates.

16. The elevator belt splice device of claim 12, wherein the third gripping region is disposed on a curvilinear portion of a second opposing end of each of the first and second clamping plates.

17. The elevator belt splice device of claim 12, wherein the second gripping region in a mid-portion of each of the first and second clamping plates, the mid-portion further comprising a generally planar region for the inner facing surfaces of the first and second clamping plates.

18. The elevator belt splice device of claim 12, wherein the wedge is replaceable with a separate wedge member having same shape and size or having a different shape and size.

19. The elevator belt splice device of claim 12, wherein the wedge is affixed by any of an adhesive, one or more fasteners, or various combinations thereof.

20. An elevator belt splice device comprising:
a first clamping plate, a second clamping plate, and a central plate disposed between the first and second clamping plates;
a wedge member removably coupled to an end of the central plate; and
a spacer member disposed between the wedge member and the central plate, the spacer member having a thickness to enable the belt splice device to accommodate belts of differing thicknesses.

21. The elevator belt splice device of claim 20, wherein the spacer member is a plate.

* * * * *